United States Patent [19]

Kelley

[11] Patent Number: 5,168,152

[45] Date of Patent: Dec. 1, 1992

[54] ATTITUDE CONTROL WITH SENSORS ON A MINING VEHICLE

[76] Inventor: Clifford W. Kelley, 29414 Whitney Collins, Rancho Pales Verdes, Calif. 90274

[21] Appl. No.: 751,557

[22] Filed: Aug. 29, 1991

[51] Int. Cl.$^5$ .......................... H01D 40/14; G01J 1/42
[52] U.S. Cl. ................................. 250/206.1; 250/372; 244/3.16
[58] Field of Search ............... 250/203.3, 203.4, 203.6, 250/206.1, 206.2, 211 K, 372; 244/3.16, 3.21, 3.11, 3.14, 171, 179, 190

[56] References Cited

U.S. PATENT DOCUMENTS

| | | | |
|---|---|---|---|
| 2,740,961 | 4/1956 | Slater | 250/206.1 |
| 3,162,764 | 12/1964 | Haviland | 250/203.3 |
| 3,715,594 | 2/1973 | Drohan et al. | 250/372 |
| 4,223,214 | 9/1980 | Dorian et al. | 250/203.4 |
| 4,225,781 | 9/1980 | Hammons | 250/203.4 |
| 4,350,890 | 9/1982 | Geclhood et al. | 250/372 |
| 4,611,914 | 9/1986 | Homma | 250/203.4 |
| 4,628,206 | 12/1986 | Astheimer | 250/372 |
| 4,786,795 | 11/1988 | Kurashima et al. | 250/203.4 |
| 4,791,533 | 12/1988 | Hane | 250/203.3 |
| 4,794,245 | 12/1988 | Auer | 250/206.2 |

Primary Examiner—David C. Nelms
Assistant Examiner—Michael Messinger
Attorney, Agent, or Firm—Julius Rubinstein

[57] ABSTRACT

A guidance system for of vehicle, such as a model airplane which has directional control devices. A device is mounted on the vehicle or at some remote station to generate a command attitude signal. At least two sensors are mounted on the body of the vehicle and face in opposite directions away from the body of the vehicle. These sensors are connected together in such a way that radiation falling on the sensors causes the sensors to produce a signal such that the signal at the junction between the sensor is functionally related to the orientation of the vehicle. A servo mechanism is mounted on the body of the vehicle and is connected to the directional control devices of the vehicle. An electric circuit is connected between the signal from the sensors and the device that generates a command attitude signal and the servo mechanism. In this way if the vehicle changes its attitude, the sensors send a signal to the electric circuit which causes the servo mechanism to correct the attitude of the vehicle, so that the vehicle is maintained at the command attitude.

12 Claims, 2 Drawing Sheets

ATTITUDE CONTROL WITH SENSORS ON A MINING VEHICLE

This invention relates generally to vehicles, such as model airplanes, pilotless surveillance airplanes, helicopters, space vehicles and submersibles. Such vehicles require a command guidance system and a servo mechanism built into the vehicle which may be controlled by devices on the vehicle or from a remote signalling station.

BACKGROUND

In recent years control systems of various kinds have been used to control flying vehicles or other vehicles moving through a wave transmitting fluid such as radiation being transmitted through the air or sound being transmitted through water. Examples of such control devices for use in flying vehicles are shown by the U.S. Pat. No. 3,162,764 to Haviland which utilizes a number of heat sensors which are aimed at a reference body such as the sun, which is much warmer than the adjacent free space. These heat sensors, properly aimed are used to operate thrust devices to control the orientation of the vehicle.

The U.S. Pat. No. 3,571,572 to Falbel utilizes infra red heat sensors which are designed to receive radiation only from a thin strip of the earth's horizon.

The U.S. Pat. No. 2,828,930 to Herbold is somewhat similar in that it employs infra red heat detectors and uses the horizon as a reference plane.

The U.S. Pat. No. 3,472,468 to Strafford also employs thermal or infra red heat detectors to use the discontinuity in temperature between a reference body and the surrounding space, as an aid to keep the space vehicle stabilized.

The U.S. Pat. No. 3,496,367 to Eckermann utilizes a number of light sensitive elements to determine when light falling on the vehicle is within a predetermined small angle of incidence, and uses this information for controlling the attitude of the space vehicle.

The U.S. Pat. No. 3,020,407 to Merlen uses infra red sensors to produce a signal which indicates the orientation of the space vehicle.

The U.S. Pat. No. 2,740,961 to Slater relates to a stable reference apparatus using lens focussed infra red radiation detectors mounted on gimbals as part of a reference apparatus for a flying vehicle.

The U.S. Pat. No. 4,223,214 to Dorian relates to a solar tracking device designed to direct a solar energy collector toward the sun and has a mechanism for tracking the sun with some safeguards to prevent overheating.

All of the above described patents are designed for control systems in situations where cost is not a factor, and they are not practical for model or pilotless aircraft.

BRIEF SUMMARY

The invention disclosed herein is based on the phenomenon that radiation from the sun, such as ultraviolet light is scattered strongly by the atmosphere and is absorbed strongly by solid objects such as the ground. This means that an ultra violet light sensor directed at the sky would respond strongly, whereas the same sensor directed at the ground would have very little response. This invention utilizes this phenomenon by using photocells of the kind whose resistance changes in accordance with the intensity of the radiation falling on it. The photocells are filtered by suitable means so only ultra violet light falls on them so they function as ultra violet light sensors. They may be used as part of an automatic pilot mechanism for aircraft, or on missiles, pilotless aircraft, or model airplanes, etc. These photo cells are connected together at a junction to form a voltage divider which produces a ratio signal whose magnitude is directly related to the attitude of the vehicle. In the embodiment shown in the drawing the sensors are mounted on the sides of the fuselage of a model aircraft, although it is understood that the drawing is for illustrative purposes only.

Referring to a model aircraft, or to a pilotless surveillance aircraft, if the aircraft is banking, one ultra violet light sensor is directed at the ground and as a result it will sense very little signal. The other ultra violet light sensor directed at the sky, will sense a strong signal. If the aircraft is flying horizontally, and the sensors are connected in series, both sensors will receive the same intensity of signal so the output signal would be one half of the voltage supply.

Because of this, the difference in intensity between both sensor is functionally related to the bank angle of the flying vehicle. Similarly if ultra violet sensors are positioned at the front and rear of the flying vehicle, and if the aircraft climbs or dives, one ultra violet light sensor directed at the sky will sense a strong signal, while the other ultra violet light sensor directed at the ground will receive a lessor signal. The difference voltage at the junction of the ultraviolet light sensors will be functionally related to the attitude of the aircraft.

An electric circuit connected between the ultra violet light sensors and a servo mechanism mounted in the flying vehicle would operate the control surfaces of the flying vehicle in accordance with a command attitude signal which could be mounted on the vehicle or could be transmitted from a remote place by a radio station on the ground.

Since ultra violet light sensors are very much cheaper than infra red sensors, the cost of such a control system would be well within the reach of even model airplane flyers.

For the most part to this point, this invention relates to vehicles which utilize the ultra violet light in the sky as illuminated from the sun as the source of radiation. It is contemplated, however that the principles of this invention could be practiced by other kinds of vehicles, such as submersibles, where instead of radiation, sensors detect ultra high frequency sound used to maintain a submerged pilotless vehicle at a command attitude, where the source of the high frequency sound may be at a considerable distance from the vehicle.

What is needed therefore and comprises an important object of this invention is to provide a control system for flying vehicles which is simple to make, economical, and reliable.

These and other objects of this invention will become more apparent when better understood in the light of the accompanying drawings and specification wherein:

BRIEF DESCRIPTION OF THE DRAWING

Referring now to FIG. 1 of the drawing, a pilotless aircraft indicated generally by the reference numeral 10 is shown in perspective view with left and right uv sensors 13 and 14 mounted on each side of the nose portion of the aircraft. The control surfaces (not shown) on the aircraft are controlled by the radio transmitter 12 on the ground which transmits a command signal to the aircraft. This compares the signals from the ultra violet light sensors 13 and 14 and causes the electric circuit 22, see FIG. 4 to control the servo mechanism in accordance with the requirements of the command signal.

As shown in FIGS. 5 and 6, the ultra violet light sensors 13 and 14 are formed from a pair of photo-responsive cells such as photo-conductive or photo-electric cells 38 (hereafter referred to as photo-cells) which are connected together to form a voltage divider. Light from the sun, falling on the respective photo-cells cells changes their respective responses in accordance with the light intensity. Consequently the voltage at the junction 15 between the sensors is a ratio signal having a magnitude which is a function of the attitude of the vehicle, see FIGS. 4 and 7.

Figure 6:
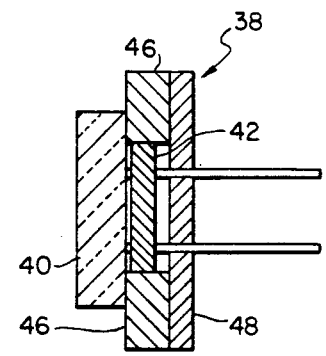
FIG. 6 is a cross sectional view of the photo-responsive cell taken on the line 6—6 of FIG. 5 and showing the ultra violet light filter in front of the photo-responsive cell.

These photo-cells are covered by a special glass 40 such as Shott glass UG-11 which acts as an ultra violet light filter. With the filter 4 mm thick, the only radiation transmitted has a wavelength of less than 410 nm. These photo cells are mounted securely on supports 46 and 48, see FIG. 6.

Figure 1:
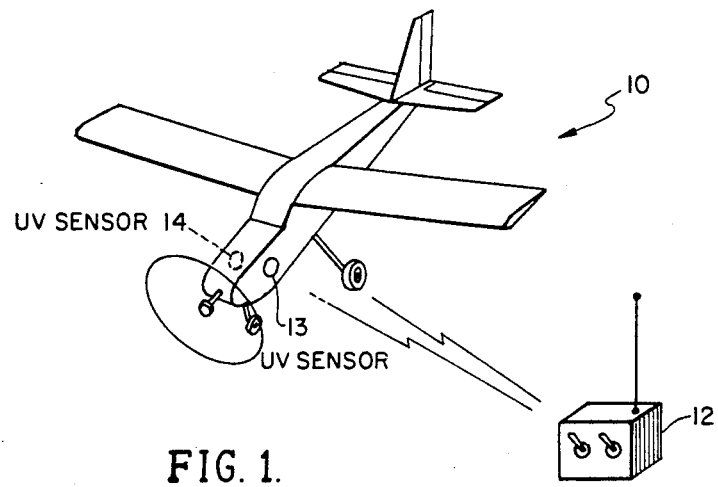
FIG. 1 is a perspective view of a model airplane with ultraviolet light sensors positioned on opposite sides of the fuselage of the aircraft and showing a radio transmitter sending a command signal to the model airplane.
Figure 2:
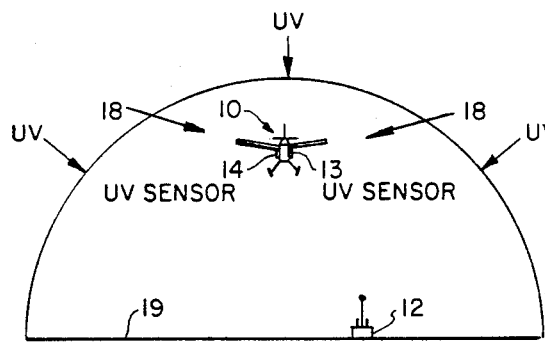
FIG. 2 is an elevational view of the sky and the horizon showing an aircraft flying in the sky with both wings level, and showing the ultraviolet light scattered by the earth's atmosphere.

As stated above, the ultra violet light from the sun is scattered over the upper atmosphere particularly during overcast conditions, while the ground reflects only a tiny portion of the ultra violet light. Accordingly, if the plane is level, as shown in FIG. 2 both sensors 13 and 14 receive an equal amount of ultra violet light, and since the sensors are connected in series and their resistances are equal, the output of the sensors at terminal 15 is one-half of the power supply voltage.

Figure 3:
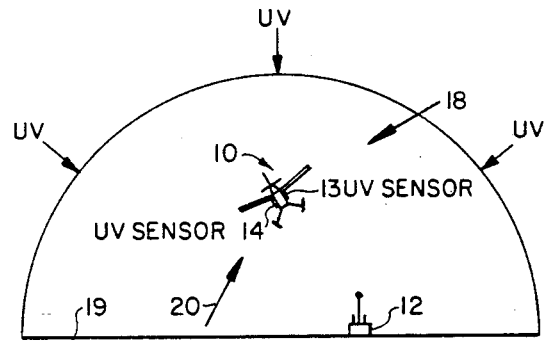
FIG. 3 is a view similar to FIG. 2 except that the airplane is banking and the ultra violet light sensor directed toward the ground receives low intensity ultra violet light, while the ultra violet light sensor directed toward the sky receives much more intense ultra violet light.

However if the aircraft is banked, as shown in FIG. 3, one ultra violet light sensor directed at the sky receives a strong signal, while the opposite sensor directed at the ground receives a lesser signal.

Figure 4:
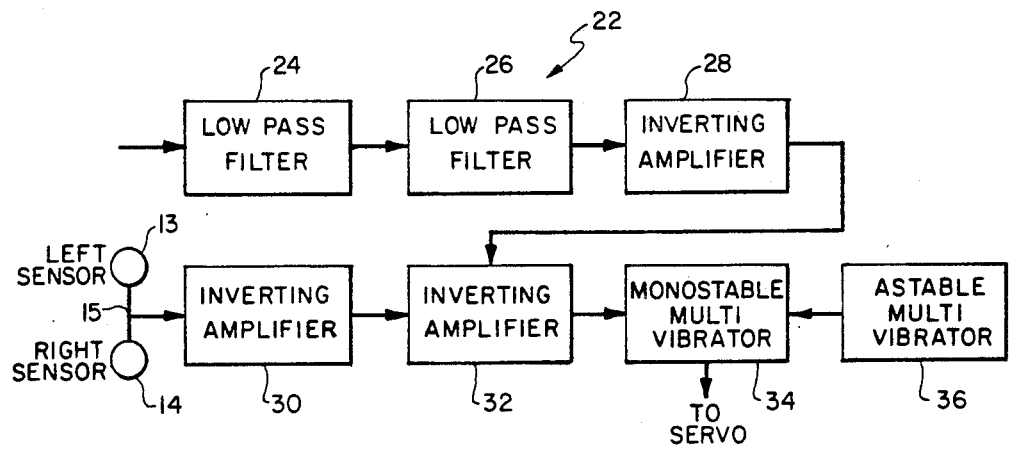
FIG. 4 is a block diagram depicting the electrical components in the form of blocks and showing their connection to the ultra violet light sensors.
Figure 5:
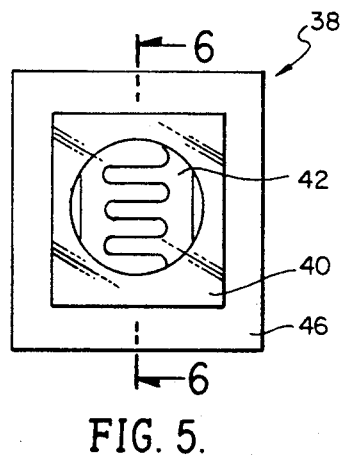
FIG. 5 is a plan view of a photo-responsive cell modified for use as an ultraviolet light sensor.
Figure 7:
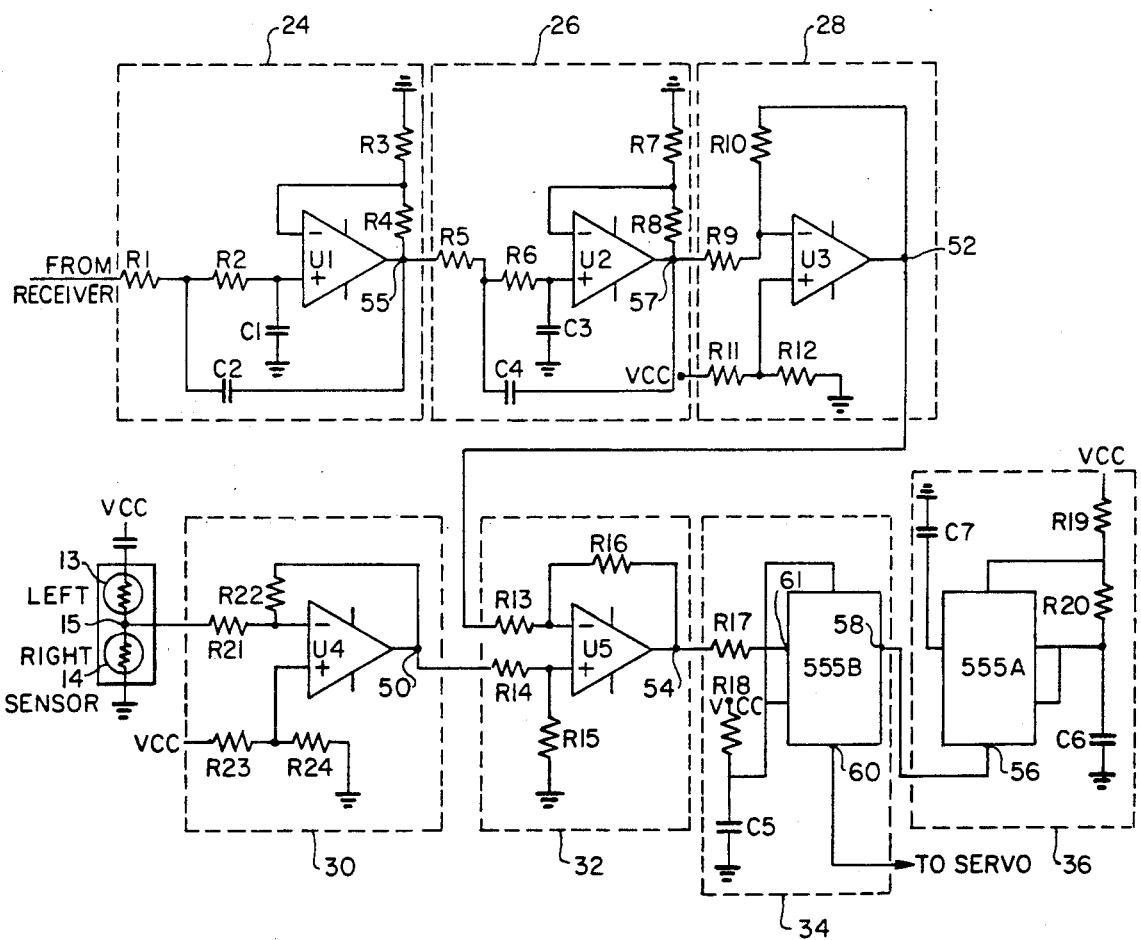
FIG. 7 shows the schematic electricl diagram of the control system for the aircraft.

With this arrangement, a current will flow from terminal 15 to the inverting amplifier 30, see FIGS. 4 and 7. This current flows through the 160K resistor R21 and through the bypass 100K resistor R22 to the output terminal 50. These voltages must be amplified to a level comparable to the DC output voltage from the inverting amplifier 28. To do this the circuit power supply Vcc is connected through the 100K resistor R23 and the grounded 125K resistor R24 to the input of the inverting amplifier 30. This increases the voltage level at terminal 50 so it can be more easily matched with the voltage ouput of inverting amplifier 28 at terminal 52. This also requires that the power supply Vcc be connected through the 425K resistor R11 and the grounded 100K resistor R12 to the positive input of inverting amplifier 28.

The transmitter 12 from the ground sends out square wave pulses which represent the command bank angle. These pulses are filtered by a network comprising the 160K R2 resistor, the grounded 47K R3 resistor, the 27K R4 resistor, and the 0.1 uf by pass capacitor C2 and the grounded 0.1 uf capacitor C1 all connected to the operational amplifier U1 which comprise the low pass filter 24 at output terminal 55.

The signal at terminal 55 is further filtered by the operational amplifier U2 which is connected to the 160K resistor R5 and the 160K resistor R6 and the grounded 47K resistor R7 which is in series with the 27K Resistor R8. As in the low pass filter 24, a by pass 0.1 uf capacitor C4 and a grounded 0.1 uf capacitor C3 form the second filter at the output terminal 57. The smoothed signal at terminal 57 is amplified by the inverting amplifier 28. This amplifier comprises the operational amplifier U3, a network comprising a 100K resistor R9, a by pass 229K Resistor R10, and a voltage supply VCC connected to the inverting amplifier to the the 425K resistor R11 and the grounded resistor R12. The junction of resistors R11 and R12 are connected to the positive input of the operational amplifier U3. The output voltage of the operational amplifier U3 at terminal 52 is proportional to the width of the square wave pulses.

Terminal 52 is connected through the 100K resistor R13 to the negative input of the inverting amplifier 32. The 100K resistors R 13, 14, 15, and 16 are chosen so the output of the inverting amplifier at terminal 54 is a voltage equal to the difference between the voltages 50 and 52 which are functionally related to the bank of the aircraft and the commanded bank angle respectively.

A servo mechanism (not shown) is connected to the control surfaces (not shown) of the aircraft 10 and is designed to operate when it receives signals with the correct pulse width and frequency. The nominal pulse width at terminal 60 is controlled by the 25K resistor R18 and the grounded 0.1 uf capacitor C5. The variation in pulse width is controlled by the output of the 1000 ohm resistor R17 at terminal 61. The astable multivibrator 36 powered by the voltage VCC which is connected to the 7.1K resistor R19 and the 271K Resistor R20 and the grounded 0.1 uf capacitors C6 the output of which at terminal 56 controls the frequency of the pulse width. This terminal is connected to the input terminal 58 of the monostable multi-vibrator 34. The output terminal 60 of the mono-stable multi vibrator 34 with pulses of the correct width and frequency are connected to the servo mechanism which guides the airplane.

Having described the invention what I claim as new is:

1. An attitude control system for vehicles moving through a wave transmitting fluid, said vehicle having a body, a device to generate a command attitude signal, stationary unfocussed wave receiving sensors on the body positioned to respond to said waves, said sensors connected together for producing a signal which is a function of the attitude of the vehicle, and automatic means for comparing said sensor produced signal with said command attitude signal for producing a difference signal which is a measure of the difference between the attitude of the vehicle and the attitude determined by the command attitude signal.

2. The attitude control system described in claim 1 wherein the vehicle has attitude control devices mounted thereon, a servo mechanism mounted on said vehicle and connected to said attitude control devices, said difference signal connected to said servo mechanism for causing the servo mechanism to actuate said attitude control devices to change the attitude of said vehicle until the difference signal is reduced to zero indicating that the attitude of the vehicle is at the command attitude.

3. An attitude control system for vehicles moving through a wave transmitting fluid, said vehicle having a body, a device to generate a command attitude signal, at least one pair of stationary unfocussed wave receiving sensors on the body of the vehicle, said sensors positioned so as the attitude of the vehicle changes one of the sensors receives a greater wave intensity than the other sensor, said sensors being the kind whose resistance changes in accordance with the intensity of the wave it receives and connected together for producing an output signal which is a function of the attitude of the vehicle, and automatic means for comparing said sensor produced output signal with said command attitude signal in such a way that a difference signal is produced which is a measure of the difference between the attitude of the vehicle and the attitude determined by the command attitude signal.

4. The attitude control system describe din claim 3 wherein the wave receiving sensors are connected together so the output signal produced by said at least one pair of sensors is a ratio between the resistances of each of the wave receiving sensors, said ratio being a magnitude which is directly related to the attitude of the vehicle.

5. The attitude control system described in claim 4 wherein said vehicle has attitude control devices mounted thereon, a servo mechanism mounted on said vehicle and connected to said attitude control devices, said difference signal connected to said servo mechanism for causing the servo mechanism to actuate said attitude control devices to change the attitude of said vehicle until the difference signal is reduced to zero indicating that the attitude of the vehicle is at the command attitude.

6. An attitude control system for a flying vehicle moving through a field of radiation, said flying vehicle having a body, attitude control devices mounted on the body of said flying vehicle, a device to generate a command attitude signal, at least two stationary unfocussed sensors mounted on the body of the vehicle, said sensors positioned on said body in such a way that if the attitude of the vehicle changes, one of the sensors receives more radiation than the other, said sensors of the kind whose resistance changes in accordance with the intensity of the radiation falling on it and connected together at a junction in such a way that radiation falling on the sensors produces at said junction an output signal which is a ratio between the resistances of the sensors and which has magnitude which is directly related to the attitude of the flying vehicle, and means for automatically comparing said sensor produced ratio signal with said command attitude signal for producing a difference signal which is a measure of the difference between the attitude of the vehicle and the attitude determined by the command attitude signal.

7. The attitude control system described in claim 6 including a servo-mechanism mounted on the flying vehicle and connected to the said attitude control devices of the flying vehicle, said difference signal connected to the servo mechanism to actuate said attitude control devices on the flying vehicle causing said flying vehicle to change its attitude until said difference signal is reduced to zero indicating that the vehicle is flying at its command attitude.

8. The attitude control system described in claim 7 wherein the field of radiation is the sky illuminated by sunlight, said stationary sensors comprising photocells, filters covering said photocells so that only ultraviolet light scattered in the sky from the sun can reach said photocells, said sensors positioned so that the if the attitude of the flying vehicle changes one sensor receives more ultraviolet light than the other increasing the difference in the resistances of the sensors, so that the ratio signal between the sensors corresponds directly to the attitude of the flying vehicle.

9. The attitude control system described in claim 8 wherein the filters covering said photo-cells are formed from Shott Glass UG-11 and are 4 mm thick which permit only ultra violet light having a wavelength less than 410 nm to pass through to said photo-cells.

10. The guidance system described in claim 9 wherein each photo-cell is provided with a support, a recess is formed in said support, each photo-cell mounted in a recess whereby said photo-cells are held in a fixed position.

11. The guidance system described in claim 8 wherein said flying vehicle is a missile.

12. The guidance system described in claim 8 wherein said flying vehicle is a pilotless airplane.

* * * * *